(12) United States Patent
Saito

(10) Patent No.: US 8,982,460 B2
(45) Date of Patent: Mar. 17, 2015

(54) AUTOSTEREOSCOPIC DISPLAY APPARATUS

(71) Applicant: JVC Kenwood Corporation, Yokohama-shi, Kanagawa (JP)

(72) Inventor: Atsushi Saito, Yokohama (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 184 days.

(21) Appl. No.: 13/711,651

(22) Filed: Dec. 12, 2012

(65) Prior Publication Data

US 2013/0163078 A1  Jun. 27, 2013

(30) Foreign Application Priority Data

Dec. 26, 2011  (JP) ................... 2011-282794

(51) Int. Cl.
   *G02B 27/22* (2006.01)
   *H04N 13/04* (2006.01)

(52) U.S. Cl.
   CPC ....... *H04N 13/0402* (2013.01); *H04N 13/0404* (2013.01); *H04N 13/0415* (2013.01); *H04N 13/0425* (2013.01); *H04N 13/0447* (2013.01)
   USPC .......................................... 359/463; 359/466

(58) Field of Classification Search
   None
   See application file for complete search history.

(56) References Cited

U.S. PATENT DOCUMENTS

2007/0188517 A1* 8/2007 Takaki ..................... 345/613
2012/0194509 A1* 8/2012 Yun et al. ................. 345/419

FOREIGN PATENT DOCUMENTS

JP   09-236777 B2   9/1997

* cited by examiner

*Primary Examiner* — Jade R Chwasz
(74) *Attorney, Agent, or Firm* — Nath, Goldberg & Meyer; Jerald L. Meyer (57) ABSTRACT

A display device is configured so that color pixels of a plurality of colors are formed in a longitudinal stripe shape. A lenticular lens is arranged on the display device, in which a periodical direction thereof is inclined with respect to the horizontal direction of the display device. A display position adjustment unit shifts a projected image data in predetermined pixel shift amounts of the respective horizontal and vertical directions including the pixel shift amount of 0, in a unit of one pixel defined by each of the color pixels of the plurality of colors in the horizontal direction of the display device and in a unit of each of the color pixels in the vertical direction thereof. A driving unit drives the display device to display the projected image data thereon.

2 Claims, 6 Drawing Sheets

| VIEWPOINT POSITION | PIXEL SHIFT AMOUNT | ADJUSTMENT VALUE FOR PRESENTING DIRECTION |
|---|---|---|
| P0 | (-1,-1) | -4 |
| P1 | (-1,0) | -3 |
| P2 | (-1,+1) | -2 |
| P3 | (0,-1) | -1 |
| P4 | (0,0) | 0 |
| P5 | (0,+1) | +1 |
| P6 | (+1,-1) | +2 |
| P7 | (+1,0) | +3 |
| P8 | (+1,+1) | +4 |

| VIEWPOINT POSITION | PIXEL SHIFT AMOUNT | ADJUSTMENT VALUE FOR PRESENTING DIRECTION |
|---|---|---|
| P0 | (+1,+2) | -8 |
| P1 | (-1,-1) | -7 |
| P2 | (-2,+2) | -6 |
| P3 | (-1,0) | -5 |
| P4 | (0,-2) | -4 |
| P5 | (-1,+1) | -3 |
| P6 | (0,-1) | -2 |
| P7 | (-1,+2) | -1 |
| P8 | (0,0) | 0 |
| P9 | (+1,-2) | +1 |
| P10 | (0,+1) | +2 |
| P11 | (+1,-1) | +3 |
| P12 | (0,+2) | +4 |
| P13 | (+1,0) | +5 |
| P14 | (+2,-2) | +6 |
| P15 | (+1,+1) | +7 |
| P16 | (-1,-2) | +8 |

FIG. 12

AUTOSTEREOSCOPIC DISPLAY APPARATUS

CROSS REFERENCE TO RELATED APPLICATION

This application is based upon and claims the benefit of priority under 35 U.S.C. §119 from Japanese Patent Application No. P2011-282794, filed on Dec. 26, 2011, the entire contents of which are incorporated herein by reference.

BACKGROUND

This embodiment relates to an autostereoscopic display apparatus having parallax in one dimensional direction.

A technology is known, in which display images change depending on positions from which the display images are viewed, using special optical members such as a lenticular lens, a slit-type barrier, and a lens array, by dividing and presenting the image displayed on a display device such as a print surface or a liquid crystal display panel in multiple viewpoint directions. As a technique using the above technology, there is one that makes the image viewed stereoscopically by inputting, to a right eye and a left eye of a person viewing the display device, a display image which consists of the same object but differ from each other (parallax images) by having specific parallax. Using the stereoscopic viewing technique, an autostereoscopic display apparatus can be put into practice, which does not require any special glasses to achieve the stereoscopic viewing.

In a case of making an image viewed stereoscopically by the autostereoscopic display apparatus, there is need to increase a number of viewpoints by dividing the display image as much as possible, in order to expand a viewing region in which the image can be viewed stereoscopically, and to obtain natural stereoscopic effect and smooth motion parallax with which viewers can endure for a long time. Recently, targeting improvement in visual confirmation and the like regarding eye-catching items and stereoscopic information in a display device with a relatively low resolution such as a digital signage and a car navigation device, the stereoscopic viewing using the parallax images has been gradually introduced. The greater the number of viewpoints becomes, the lower the resolution becomes. It should be noted that resolution is defined as a physical property inherent in a display device itself, and resolution feeling is defined as a degree of resolution perceived by a person. Even in a case of making the display image stereoscopically in the low resolution display device, there is also need to suppress the lowering of resolution and to achieve the natural stereoscopic viewing.

To fulfill the above needs, a multiple view system is effective, in which viewpoints are divided as finely as possible, instead of dividing the viewpoints by assuming an eye position of a viewer who views the display device in a space, so that the viewer can view the display device with any of viewpoints. In order to increase the number of division of the parallax image, it is effective to increase, for example, a lens pitch in a case of using the lenticular lens with respect to a pixel pitch of the display device. However, by enlarging effect of the lens, respective color pixels become large relative to the lens pitch, degrading the resolution of the parallax image in a pitch direction of the lens. This makes the resolution feeling different in horizontal and vertical directions. The same influence appears in a case of using the optical member such as the barrier.

A technique is disclosed in Japanese Patent No. 3940456 (Patent Document 1) to solve the above trouble. Here, a periodical direction of cylindrical lenses (optical lenses) configuring a lenticular lens (optical member) is inclined with respect to the horizontal direction of a pixel array of a display device. With the technique of Patent Document 1, one three-dimensional pixel is configured using pixels of the vertical direction as well as pixels of the horizontal direction, improving balance of the resolution feeling between the horizontal and vertical directions.

SUMMARY

Regarding an autostereoscopic display apparatus such as the one disclosed in Patent Document 1, in a case of a display device thereof being a color display device in which, for example, red (R), green (G) and blue (B) color pixels (sub-pixels) are arranged in a longitudinal stripe manner, a relative position between the lenticular lens and the display device need to coincide with each other to accuracy of sub-pixel scale. However, making the relative position between the lenticular lens and the display device to coincide to the accuracy of sub-pixel scale is difficult. Therefore, in practice, the autostereoscopic display apparatus is manufactured in a state in which the relative position between the lenticular lens and the display device are shifted with respect to each other.

It is assumed that the relative position between the lenticular lens and the display device are coincided with each other to the accuracy of sub-pixel scale, so that regarding one of the cylindrical lenses configuring the lenticular lens, both end images among multiple viewpoint images are allocated to both end sides in a width direction of the cylindrical lens, and a center viewpoint image is allocated to the center in the width direction of the cylindrical lens. In this case, the multiple viewpoints are presented symmetrically with respect to a straight line vertical to a display surface. However, in the case of the relative position between the lenticular lens and the display device being shifted from each other, the multiple viewpoints cannot be made symmetrical but presented in an off-set manner in one direction.

In this case, a viewer cannot view stereoscopic images comfortably when viewing the autostereoscopic display apparatus from the vertical direction to the display surface. The viewer needs to view the autostereoscopic display apparatus while searching for a direction from which the stereoscopic images can be viewed comfortably, causing convenience to be reduced. Even if the autostereoscopic display apparatus is assumed to be viewed from an oblique direction to the display surface, it is difficult to set a region in which the stereoscopic images can be comfortably viewed according to viewing positions, because a degree of the off-set for the multiple viewpoints differ from a degree of the shift of the relative position between the lenticular lens and the display device.

For the above reasons, an autostereoscopic display apparatus is desired, which is capable of adjusting a region from which the stereoscopic images can be viewed comfortably. Here, it is also desired that the adjustment can be made in a simple configuration.

The embodiment aims to provide an autostereoscopic display apparatus capable of adjusting a region from which a stereoscopic image can be viewed comfortably with a simple configuration.

In order to solve the problem of the above described conventional art, an aspect of the embodiment provides an autostereoscopic display apparatus comprising: a display device of which color pixels of a plurality of colors are formed in a longitudinal stripe shape, in which the color pixels of one color are arranged in a vertical direction of the display device in a plurality of columns and the color pixels of the plurality of colors are arranged repeatedly in a horizontal direction of the display device; an optical member, in which a plurality of optical lenses are periodically arranged, the periodical direction of the optical lenses are arranged in an inclined manner with respect to the horizontal direction of the display device, respective color pixel data of projected image data formed of a plurality of viewpoint images are allocated to the color pixels to display the projected image data on the display device, so that the viewpoint images are divided and presented in a plurality of viewpoint directions; a display position adjustment unit configured to shift the projected image data in predetermined pixel shift amounts of the respective horizontal and vertical directions including the pixel shift amount of 0 respectively in the horizontal and vertical directions of the display device, when displaying the projected image data on the display device, in a unit of one pixel defined by each of the color pixels of the plurality of colors in the horizontal direction of the display device and in a unit of each of the color pixels in the vertical direction of the display device; and a driving unit configured to drive the display device to display the projected image data thereon in a state of the projected image data being shifted by the display position adjustment unit.

DETAILED DESCRIPTION

Figure 1A:
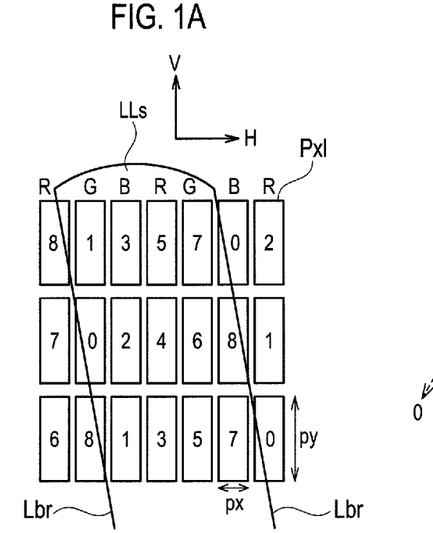
FIG. 1A is a view showing a preferable relative position between color pixels Pxl of a display device and a lenticular lens LLs, in an autostereoscopic display apparatus of a multiple view system.

Hereafter, an autostereoscopic display apparatus of an embodiment is described with reference to the accompanying drawings. First, using FIG. 1A, preferable relative position between color pixels Pxl of a display device and a lenticular lens are described. FIG. 1A adopts an example of an autostereoscopic display apparatus in which projected image data of nine viewpoints, viewpoints 0 to 8, can be displayed.

In FIG. 1A, a plurality of color pixels Pxl is arranged in horizontal (H) and vertical (V) directions. Numbers on the color pixels Pxl respectively indicate numbers of viewpoint images displayed on the respective color pixels Pxl. The color pixels Pxl shown here are so-called sub-pixels, and respective color pixels Pxl of the colors of red (R), green (G) and blue (B) are arranged in a longitudinal stripe manner. Here, only one cylindrical lens is shown; however, a lenticular lens LLs is provided on the arranged plurality of color pixels Pxl so that a periodical direction of the cylindrical lenses is inclined with respect to the horizontal direction of which the color pixels Pxl are arranged. The periodical direction of the cylindrical lenses (lenticular lens LLs) is a direction orthogonal to border lines Lbr of the cylindrical lenses.

Assuming that black stripes are not present, pixel pitch of the color pixels Pxl in the horizontal direction is px and the pixel pitch thereof in the vertical direction is py. Lens pitch of the lenticular lens LLs in the horizontal direction is 4.5 px, and an inclined angle thereof is $\tan^{-1}$ (px/2py).

Figure 1B:
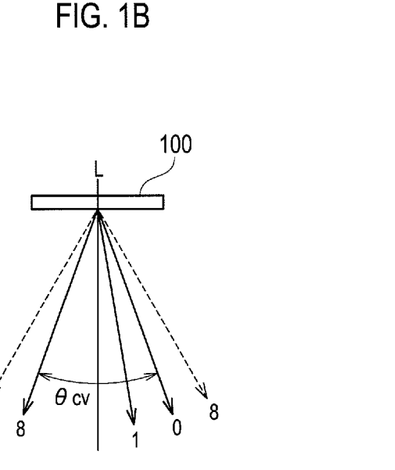
FIG. 1B is a view showing presenting directions of a multiple viewpoint image in a case of the preferable relative positions in FIG. 1A.

FIG. 1B shows presenting directions of the respective viewpoints 0 to 8, in a case of FIG. 1A. When viewing an autostereoscopic display apparatus 100 from the vertical direction to the display surface thereof, as shown in FIG. 1B, the viewpoints 0 to 8 are presented symmetrically with respect to the straight line L vertical to the display surface. A viewing region θcv in which the viewer can comfortably view stereoscopic images becomes symmetrical with respect to the straight line L.

Figure 2:
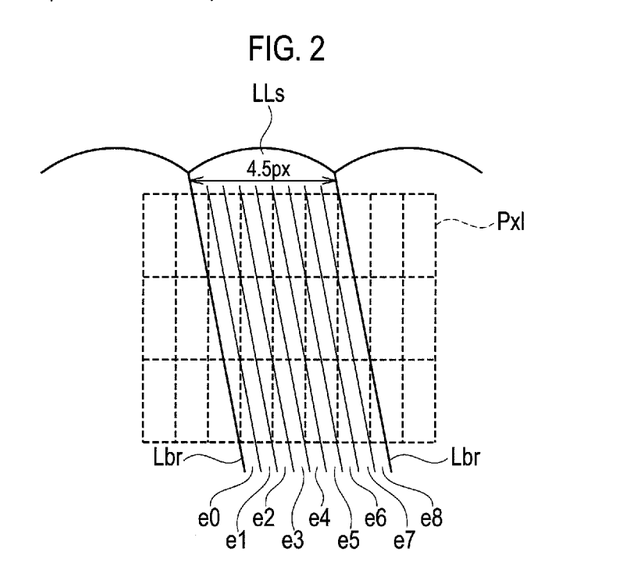
FIG. 2 is a view explaining a determination method of correspondence relation between the lenticular lens LLs and the multiple viewpoint image displayed on the respective color pixels Pxl.

In addition, a correspondence relation between the lenticular lens LLs and color pixel data of nine viewpoints of the viewpoints 0 to 8 displayed on the respective color pixels Pxl shown in FIG. 1A is determined as illustrated in FIG. 2. The color pixel data of the nine viewpoints are displayed over width in the horizontal direction of the lenticular lens LLs. Therefore, as shown in FIG. 2, the width is divided into nine sections, from regions e0 to e8. Then, the respective viewpoints are allocated to the regions e0 to e8. Further, depending on which of the regions e0 to e8 the center points of the respective color pixels Pxl are included in, the viewpoints 0 to 8 are allocated to the respective color pixels Pxl.

As the lens pitch of the lenticular lens LLs in the horizontal direction is 4.5 px and the inclined angle is $\tan^{-1}$(px/2py), the color pixel data of the viewpoint 4 is positioned just at the center of the right and left borderlines Lbr of the cylindrical lens. Accordingly, the color pixel data of the viewpoint 4 is presented at the center of the viewing region θcv (on the straight line L) shown in FIG. 1B.

Figure 3A:
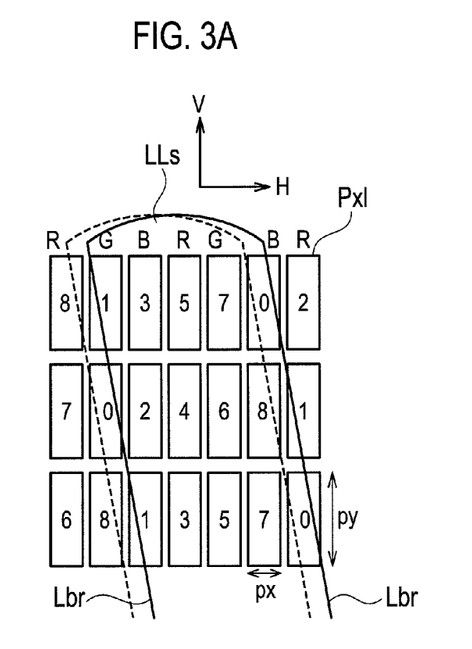
FIG. 3A is a view showing a state of the autostereoscopic display apparatus of the multiple view system, in which the relative position between the color pixels Pxl of the display device and the lenticular lens LLs is shifted with respect to that shown in FIGS. 1A and 1B.
Figure 3B:
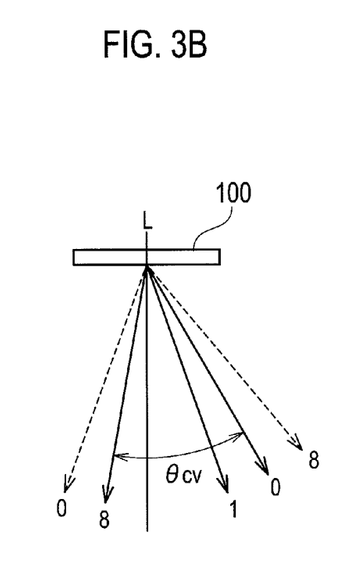
FIG. 3B is a view showing presenting directions of a multiple viewpoint image in a case of the relative positions being shifted as shown in FIG. 3A.

FIG. 3A shows a state in which the lenticular lens LLs of FIG. 1A is shifted by 0.5 sub-pixels towards the right in the horizontal direction. The position of the lenticular lens LLs in FIG. 1A is indicated by dashed lines, and the position of the lenticular lens LLs indicated by solid lines is shifted by 0.5 sub-pixels therefrom. When the relative position of the lenticular lens LLs shifts by 0.5 sub-pixels in the horizontal direction, the presenting direction of the stereoscopic image shifts by one viewpoint. In this case, if the projected image data displayed on the autostereoscopic display apparatus 100 is the same as the one in FIG. 1A, the viewpoints 0 to 8 are presented as illustrated in FIG. 3B. Then, the viewing region θcv in which the viewer can comfortably view the stereoscopic images is presented in an off-set manner in one direction.

This means, the viewer cannot comfortably view the stereoscopic images when viewing the autostereoscopic display apparatus 100 from the vertical direction to the display surface. The viewer needs to adjust one's viewing direction to the center direction of the viewing region θcv to comfortably view the stereoscopic images. This reduces convenience of viewing the autostereoscopic display apparatus 100.

In order to solve the trouble caused by the shift of the relative position, the display position of the projected image displayed on the display device of the autostereoscopic display apparatus 100 may be adjusted by signal processing. However, the relative position between the lenticular lens LLs and the display device is shifted only by 0.5 sub-pixels, and the adjustment by the amount of as small as 0.5 sub-pixels cannot be performed.

Although not illustrated, when the relative position of the lenticular lens LLs and the display device shifts by one pixel in the horizontal direction, the presenting direction of the stereoscopic image shifts by two viewpoints. In this case, the positional adjustment by one sub-pixel can be performed; however, in the color display device in which R, G and B color pixels are arranged in the longitudinal stripe manner, colors change if the positional adjustment is performed by one sub-pixel.

Figure 4:
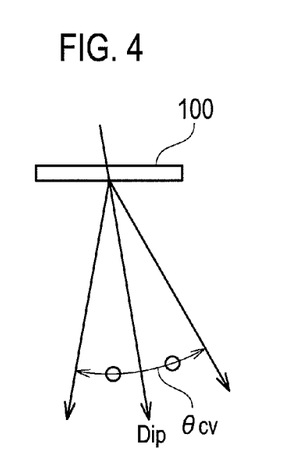
FIG. 4 is a view explaining a definition of a projected image presenting direction Dip.

A description is made hereinafter, in which the trouble caused by the shift of the relative position between the lenticular lens and the display device is solved in a simple configuration. As illustrated in FIG. 4, a direction by which the viewing region θcv is equally divided is defined by a projected image presenting direction Dip, where the viewing region θcv is the region in which the viewer can comfortably view the stereoscopic image.

Figure 5:
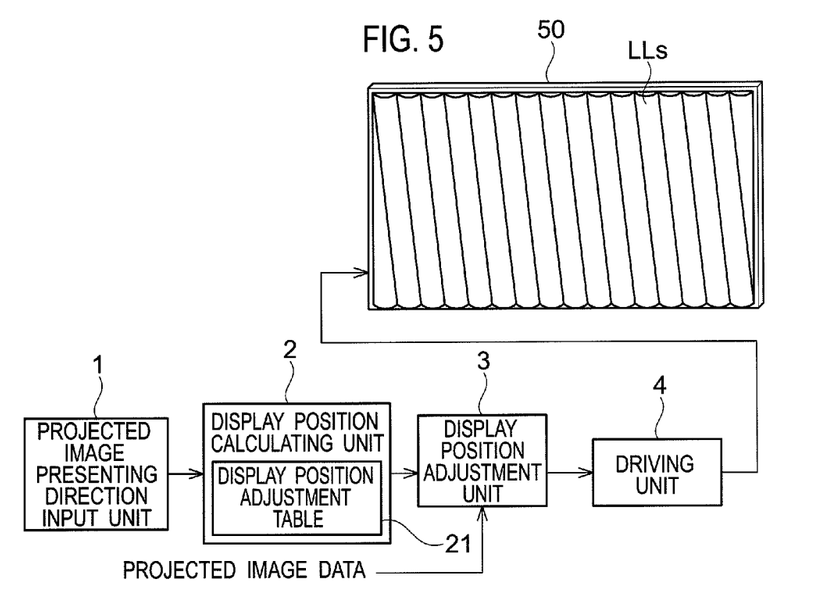
FIG. 5 is a block diagram showing an autostereoscopic display apparatus of an embodiment.

In FIG. 5, a projected image direction input unit 1 is an operation input unit with which a predetermined adjustment value to set the projected image presenting direction Dip desired by the viewer can be inputted. The adjustment value for setting the projected image presenting direction Dip inputted by the projected image direction input unit 1 is then inputted into a display position calculation unit 2. The display position calculation unit 2 includes a later-described display position adjustment table 21. The display position calculation unit 2 generates display position adjustment data for adjusting the display position corresponding to the adjustment value of the projected image presenting direction Dip, based on the display position adjustment table 21, and supplies the generated data to a display position adjustment unit 3.

The projected image data to be displayed on a display device 50 is inputted into the display position adjustment unit 3. Based on the display position adjustment data supplied from the display position calculation unit 2, the display position adjustment unit 3 shifts color pixel data of the projected image data before supplying the projected image data to a driving unit 4, so that the position of the projected image displayed on the display device is adjusted as a result. The display device 50 is a liquid crystal panel as one example, and on the surface of the display device 50, the lenticular lens LLs as one example of an optical member is attached. The driving unit 4 drives the display device 50 to cause the projected image data to be displayed thereon.

Figure 6:
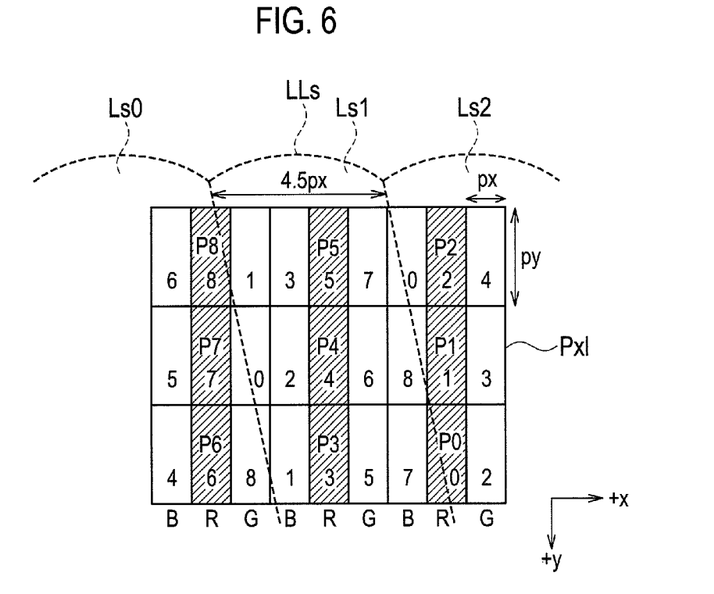
FIG. 6 is a view explaining a shift of pixels in the embodiment in a case of using an autostereoscopic display apparatus that can display projected image data of nine viewpoints.

As in FIG. 1, lens pitch is set to 4.5 px and an inclined angle to $\tan^{-1}$ (px/2py) in FIG. 6. Also, by the method described using FIG. 2, FIG. 6 shows a state in which nine viewpoints, viewpoints 0 to 8, are allocated to the respective color pixels Pxl. In the drawing, three cylindrical lenses Ls0 to Ls2 of the lenticular lens LLs are illustrated. FIG. 6 shows an ideal state in which the lenticular lens LLs and the respective color pixels Pxl of the display device 50 are aligned to accuracy of sub-pixel scale so that the viewpoint 0 is allocated to the left end of one of the cylindrical lenses and the viewpoint 8 to the right end thereof. In this state, as it can be seen from FIG. 1B, the projected image presenting direction Dip coincides with the vertical direction with respect to the display surface.

Generally, positional adjustment of the projected image data by the amount of one pixel which is formed by three sub-pixels, R, G, and B sub-pixels, is easy. In this embodiment, using the configuration of the cylindrical lens being inclined with respect to the horizontal direction of the color pixels Pxl of the display device 50, the projected image presenting direction Dip is adjusted by shifting the displaying position of the projected image data in the vertical direction as well as in the horizontal direction.

A method of creating the display position adjustment table 21 is described using FIG. 6. As illustrated in FIG. 6, the respective color pixels Pxl of the viewpoints 0 to 8 are defined as P0 to P8. Focusing on the color pixel P4 which is the nearest to the projected image presenting direction Dip, because the color pixel P4 is the color pixel Pxl of R, the projected image data can be shifted without any problem, when the projected images of the color pixels to be displayed on P0 to P3 and P5 to P8, which are the color pixels Pxl also of R, to be displayed on the color pixel P4.

In FIG. 6, shift in the rightward direction is defined as +x direction and shift in the downward direction is defined as +y direction. For example, when a projected image of the color pixel to be displayed on the color pixel P0 is shifted to be displayed on the color pixel P4, then, the projected image to be displayed is shifted by −1 pixel in the x direction and −1 pixel in the y direction. One pixel in the y direction corresponds to one color pixel. The color pixel P0, which should have color pixel data of the viewpoint 4 displayed thereon, has color pixel data of the viewpoint 0 displayed thereon instead. This means a change in the viewpoint becomes −4, causing the projected image presenting direction Dip to shift by −4. Likewise for the color pixels P1 to P3, and P5 to P8, relationship is searched, between a pixel shift amount (x, y) when shifting the projected image data to be displayed on the color pixel P4 and an adjustment value for the presenting direction.

Figure 7:
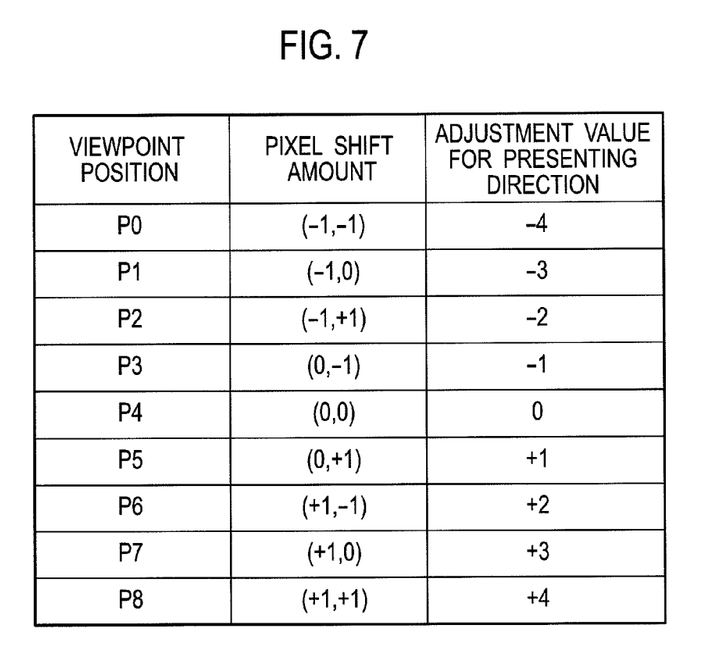
FIG. 7 is a view showing an example of a display position adjustment table 21 used in a case of FIG. 6.

FIG. 7 shows the display position adjustment table 21 created as described above. Viewpoint positions indicate respective original color pixels, when the color pixels P0 to P8 are respectively shifted to the color pixel P4. The color pixel P4 requiring no shift is also included. Here, information of the viewpoint positions is included for easier understanding, however, in the actual display position adjustment table 21, only the relationship of the pixel shift amount (x, y) and the adjustment value for the presenting direction may be included.

Figure 8:
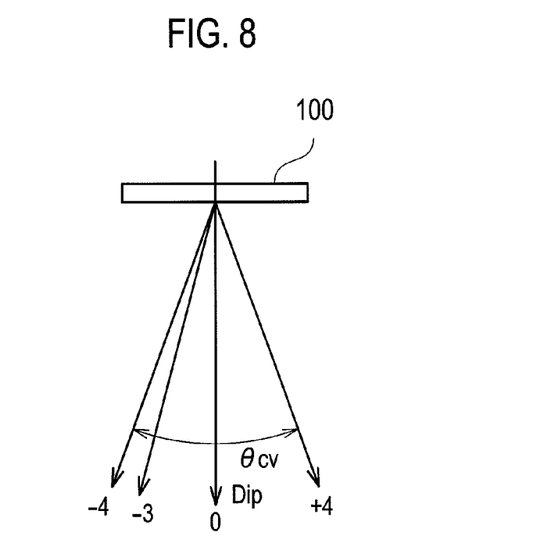
FIG. 8 is a view explaining presenting directions of viewpoints generated by using adjustment values of the presenting directions shown in FIG. 7.

FIG. 8 illustrates directions of the adjustment values +4 to −4 for the presenting direction shown in the display position adjustment table 21 of FIG. 7. In order to change the presenting direction from 0 to −4, a shift of (−1,−1) may be performed for shifting the projected image of the color pixel P0 to that of the color pixel P4 by the display position adjustment unit 3 described in FIG. 5. On the other hand, in order to change the presenting direction from 0 to +4, a shift of (+1, +1) may be performed for shifting the projected image of the color pixel P8 to that of the color pixel P4.

The projected image presenting direction input unit 1 in FIG. 5 includes an operation input unit such as a mouse and a keyboard, and the viewer uses the operation input unit to input any of the adjustment values +4 to −4 for the presenting direction. The display position calculation unit 2 refers to the display position adjustment table 21 to calculate the pixel shift amount corresponding to the adjustment value for the presenting direction inputted.

As described using FIG. 3A, in the case of the relative position between the lenticular lens LLs and the display device 50 being shifted so that the viewing region θcv is shifted in the off-set manner in one direction with respect to the straight line L as shown in FIG. 3B, the projected image data only needs to be shifted by the pixel shift amount (x, y) set in the display position adjustment table 21. This allows the adjustment of the projected image presenting direction Dip without causing the trouble of image colors being changed.

Further, even in a case in FIG. 1A in which the relative position between the lenticular lens LLs and the display device 50 is not shifted and the viewing region θcv is symmetrical with respect to the straight line L as shown in FIG. 1B, when it is assumed that the viewer may intentionally view the autostereoscopic display apparatus 100 from the oblique direction with respect to the display surface, likewise to the above, the projected image presenting direction Dip can be adjusted by shifting the projected image data by the pixel shift amount (x, y) set in the display position adjustment table 21.

As described above, according to this embodiment, the projected image presenting direction Dip can be appropriately changed. In FIG. 6, the example is described, in which the color pixel P4 is taken as a reference and the projected images to be displayed on the color pixels P0 to P3, and P5 to P8 are shifted to be displayed on the color pixel P4. However, this is merely an example, and the reference color pixel Pxl can be chosen arbitrarily.

In the example shown in FIG. 6, the lens pitch is 4.5 px, and as shown in FIG. 8, the projected image presenting direction Dip is changeable in 9 stages. Accordingly, the projected image presenting direction Dip can be adjusted with equivalent resolution as in a case of performing the position adjustment by 0.5 sub-pixels, the value of which is calculated by dividing 4.5 by 9 (4.5/9). In addition, the respective pixel shift amounts shown in FIG. 7 are the smallest shift amounts with which the projected image presenting direction Dip can be adjusted, and the pixel shift amounts can be made larger by the integral multiple of the values shown in FIG. 7. For example, in order to obtain an adjustment value of −4 for the presenting direction, instead of using the pixel shift amount of (−1, −1), the pixel shift amount of (−1, +1) is applied twice to generate the adjustment value of −2, and then the pixel shift amount of (−2, +2) is applied to generate the adjustment value of −4 as a result.

In this embodiment, it is not necessary to generate projected image data in which a correspondence relation between the respective color pixels Pxl and the color pixel data is adjusted, to match the relative position of the lenticular lens LLs and the display device 50. Accordingly, in this embodiment, the trouble caused by the shift of the relative position between the lenticular lens LLs and the display device 50 can be solved in the simple configuration.

Next, the adjustment method of this embodiment can be applied to autostereoscopic display apparatuses other than the one that can display a projected image of nine viewpoints.

Figure 9:
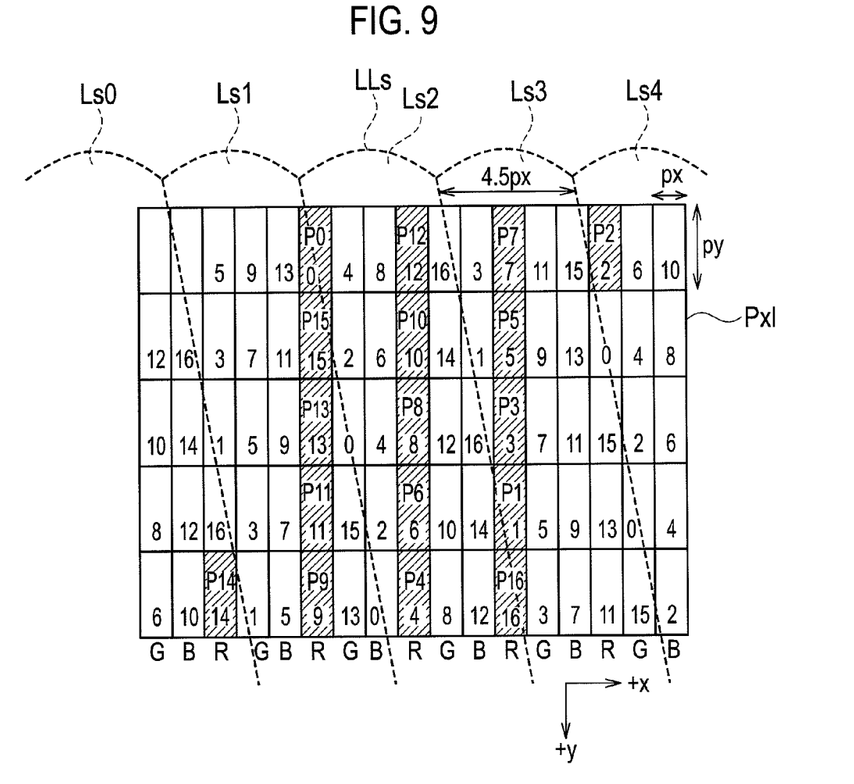
FIG. 9 is a view explaining a shift of pixels in the embodiment in a case of using an autostereoscopic display apparatus that can display projected image data of seventeen viewpoints.

FIG. 9 illustrates an autostereoscopic display apparatus that can display an image having seventeen viewpoints. Numbers on the color pixels Pxl respectively indicate numbers of viewpoint images, from viewpoints 0 to 16. Here, five cylindrical lenses Ls0 to Ls4 are shown. Lens pitch of the lenticular lens LLs in the horizontal direction is 4.25 px, and an include angle thereof is $\tan^{-1}(px/2py)$. In addition, a correspondence relation between the lenticular lens LLs and the seventeen viewpoint images of the viewpoints 0 to 16, displayed on the respective color pixels Pxl, may be determined as described in FIG. 2.

Figure 10:
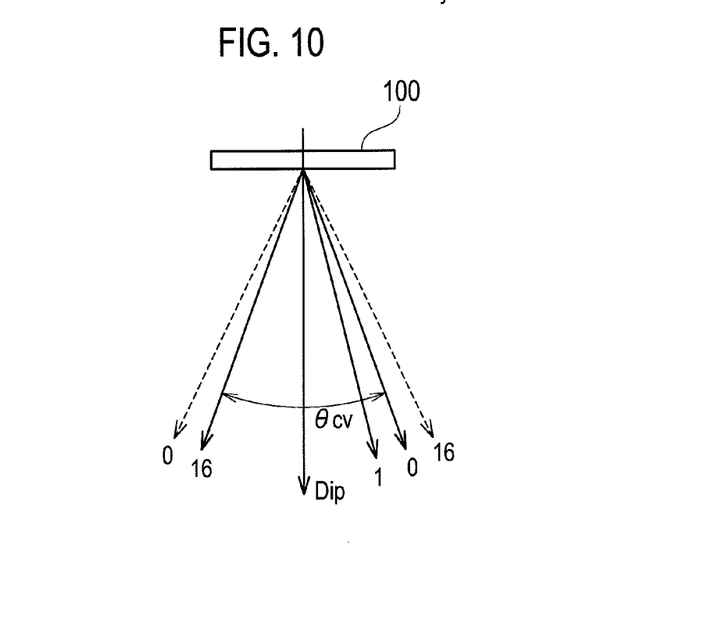
FIG. 10 is a view showing a projected image presenting direction Dip in a case of FIG. 9.

In this state, as shown in FIG. 10, a projected image presenting direction Dip coincides with the vertical direction to the display surface.

As illustrated in FIG. 9, hatched color pixels Pxl of the viewpoints 0 to 16 are defined as P0 to P16. As in the above case, shift in the rightward direction is defined as +x direction and shift in the downward direction is defined as +y direction. Taking the color pixel P8 as a reference, which is the nearest color pixel of R to the projected image presenting direction Dip, and searching a relationship between a pixel shift amount (x, y) in a case of shifting projected images of the color pixels P0 to P7, and P9 to P16, which are the color pixels Pxl also of R, and adjustment values of the presenting directions, a display position adjustment table 21 as shown in FIG. 11 is created.

In a case shown in FIG. 9 with the seventeen viewpoints, a pixel shift amount lies in a range of −2 to +2. In addition, with this pixel shift amount of the range between −2 to +2, 25 types of shifts are present; however, referring to FIG. 9, regarding four color pixels Pxl arranged above the color pixel P14 in the same column and four color pixels Pxl arranged below the color pixel P2 in the same column, adjustment values for the presenting direction overlap with that of the color pixels P0 to P16, thus the adjustment values thereof do not need to be set in the display position adjustment table 21.

Figure 11:
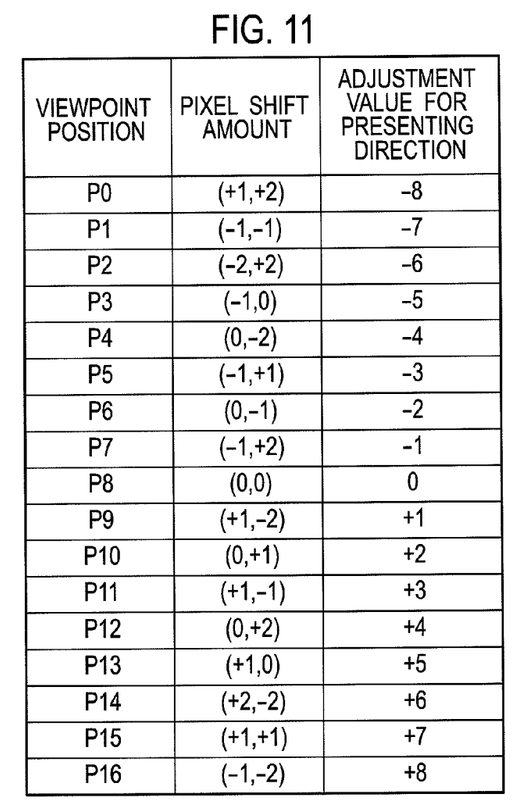
FIG. 11 is a view showing an example of the display position adjustment table 21 used in a case of FIG. 9.
Figure 12:
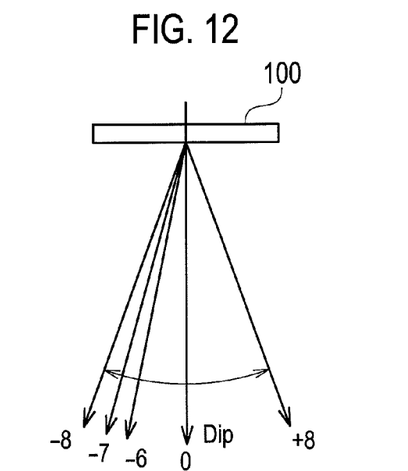
FIG. 12 is a view showing presenting directions of viewpoints generated by using the adjustment values of the presenting directions shown in FIG. 11.

FIG. 12 illustrates directions indicated in the respective adjustment values +8 to −8 for the presenting direction of the display position adjustment table 21 shown in FIG. 11. The lens pitch in the example of FIG. 9 is 4.25 px, and as shown in FIG. 12, the projected image presenting direction Dip can be adjusted by 17 stages. Accordingly, the projected image presenting direction Dip can be adjusted with equivalent resolution as in a case of performing the position adjustment by 0.25 sub-pixels, the value of which is calculated by dividing 4.25 by 17 (4.25/17).

In FIG. 9, the example is described, in which the color pixel P8 is taken as a reference and the projected images to be displayed on the color pixels P0 to P7, and P9 to P16 are shifted to be displayed on the color pixel P8. However, this is merely an example, and the reference color pixel Pxl can be chosen arbitrarily.

As described above, according to the autostereoscopic display apparatus of this embodiment, the region from which the stereoscopic images can be comfortably viewed can be adjusted with the simple configuration.

The present invention is not limited to the above described embodiment, but various changes can be made without departing from the scope of the present invention. The pixel shift amount (x, y) and the adjustment value for the presenting direction, which are set in the display position adjustment table 21, may be appropriately set according to the lens pitch in the horizontal direction of the lenticular lens LLs and the inclined angle thereof. Instead of providing the display position adjustment table 21, values of the pixel shift amount (x, y) may be calculated according to the adjustment values for the presenting direction.

In this embodiment, the case of using the lenticular lens as the optical member is described; however, the optical member is not limited to the lenticular lens, but may be a slit-type barrier or a lens array. Nevertheless, the lenticular lens is preferable as the optical member.

What is claimed is:

1. An autostereoscopic display apparatus comprising:
a display device of which color pixels of a plurality of colors are formed in a longitudinal stripe shape, in which each one color of the color pixels are arranged in a vertical direction of the display device in a plurality of columns and the color pixels of the plurality of colors are arranged repeatedly in a horizontal direction of the display device, one color pixel being a sub-pixel and the plurality of color pixels being defined as one pixel; and
an optical member, in which a plurality of optical lenses are periodically arranged, the periodical direction of the optical lenses are arranged in an inclined manner with respect to the horizontal direction of the display device, respective color pixel data of image data formed of a plurality of viewpoint images are allocated to the color pixels to display the image data on the display device, so that the viewpoint images are divided and presented in a plurality of viewpoint directions, wherein
a relative position between the optical member and the display device being shifted from each other from the state in which the relative position coincides with each other to the accuracy of a sub-pixel scale, and wherein the autostereoscopic display apparatus further comprises:
a display position adjustment unit configured to shift the image data, when displaying the image data on the display device, in a first pixel shift amount in the horizontal direction of the display device, in a unit of one pixel defined by the plurality of color pixels in the horizontal direction of the display device, and in a second pixel shift amount in the vertical direction of the display device, in a unit of each of the color pixels in the vertical direction of the display device, the first or the second pixel shift amount being allowed to be 0; and
a driving unit configured to drive the display device to display the image data thereon in a state of the image data being shifted by the display position adjustment unit.

2. The autostereoscopic display apparatus according to claim 1 further comprising:
a display position calculation unit configured to calculate the pixel shift amount that shifts the image data in the horizontal and vertical directions, based on a display position adjustment table including a plurality of adjustment values for adjusting directions to which the plurality of viewpoint images are presented and the pixel shift amounts in the horizontal and vertical directions corresponding to the plurality of adjustment values, and
wherein the display position adjustment unit shifts the image data according to the pixel shift amount calculated by the display position calculation unit.

* * * * *